United States Patent [19]

D'Alelio

[11] 3,929,713

[45] Dec. 30, 1975

[54] POLYMERIZING BIS-MALEIMIDES AND POLYIMIDES THEREFROM

[75] Inventor: Gaetano F. D'Alelio, South Bend, Ind.

[73] Assignee: E. I. Du Pont de Nemours & Co., Wilmington, Del.

[22] Filed: Aug. 14, 1974

[21] Appl. No.: 497,492

Related U.S. Application Data

[63] Continuation-in-part of Ser. No. 363,799, May 25, 1973.

[52] U.S. Cl. .................. 260/32.6; 117/72; 117/73; 117/128.4; 117/161 P; 161/197; 161/205; 161/227; 260/30.2; 260/30.8 R; 260/30.8 DS; 260/32.2; 260/32.4; 260/37 N; 260/47 UA; 260/47 CP; 260/49; 260/63 N; 260/65; 260/78 UA

[51] Int. Cl.² .................. C08G 73/10; C08G 73/12

[58] Field of Search...... 260/78 UA, 47 UA, 47 CZ, 260/47 CP, 65, 78 TF, 63 N, 49, 326 R, 326 S, 30.2, 30.8 R, 30.8 DS, 32.2, 32.4, 32.6 N

[56] References Cited
UNITED STATES PATENTS

| | | | |
|---|---|---|---|
| 3,576,691 | 4/1971 | Meyers | 156/309 |
| 3,671,490 | 6/1972 | Bargain | 260/47 |
| 3,732,189 | 5/1973 | Crivello et al. | 260/78 |
| 3,740,378 | 6/1973 | Crivello | 260/78 |

*Primary Examiner*—Lester L. Lee

[57] ABSTRACT

Processes for preparing polyimides from bis-maleimides are provided. In these processes, the bis-maleimides are B-staged in solvents by passing through the solution oxygen or oxygen-containing inert gases at a temperature from about 100°C. to about the boiling point of the solvent. These solutions can be used directly as coatings and impregnants, particularly in the presence of catalytic quantities of Bronsted acid salt catalysts. From these solutions, the solid B-staged product can be isolated and then mixed with catalysts, activators, fillers and the like and used in molding processes and the like. When cured, the polymers are highly thermally stable in both nitrogen and air.

23 Claims, No Drawings

POLYMERIZING BIS-MALEIMIDES AND POLYIMIDES THEREFROM

RELATIONSHIP TO OTHER APPLICATIONS

This application is a continuation-in-part of my copending application Ser. No. 363,799, filed May 25, 1973.

BACKGROUND OF THE INVENTION

1. Field of Invention:

This invention relates to processes for preparing polyimides and more particularly to processes for preparing polyimides prepared from bis-maleimides.

2. Prior Art:

The preparation of heat-resistant polyimides obtained by reacting bis-maleimides and diamines in polar solvents is known in the prior art. British Pat. No. 1,280,846 describes an improvement on this process in which the reaction is carried out in the presence of a strong acid or of an inhibitor of free radicals. Polyimides derived from bis-maleimides give off very little by-products when cured; however, they tend to be more brittle and have a lower thermal oxidative stability than aromatic polyimides derived from the condensation reaction of an aromatic dianhydride and aromatic diamine.

The polymerization of N-phenyl-maleimide with sodium salts of Bronsted acids in dimethylformamide is described by Koichi Yamaguchi and Yuji Minoura in Journal of Polymer Science: Part A-1, Vol. 8 (1970) pages 1571–1586. Polymers resulting from this polymerization are of low molecular weight.

The inventor is aware of no prior art wherein oxygen or oxygen-containing inert gases have been used to B-stage bis-maleimides.

SUMMARY OF THE INVENTION

According to the present invention, there is provided a process for B-staging a bis-maleimide of the formula:

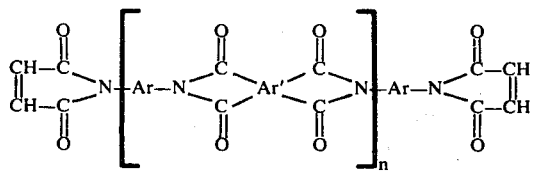

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
$n$ is 0 or a positive integer of 1 to 20,
in a solvent by passing oxygen or an oxygen-containing inert gas through the solution at a temperature from about 100°C. to about the boiling point of the solvent.

DETAILED DESCRIPTION OF THE INVENTION

Bis-maleimides are prepared, as is known in the art, by the reaction of maleic anhydride and a diamine. The bis-maleimides used in the present process can be prepared as known in the art or by the azeotroping process described in my copending application Ser. No. 363,800, filed May 25, 1973. The bis-maleimides useful in the present invention have the structural formula:

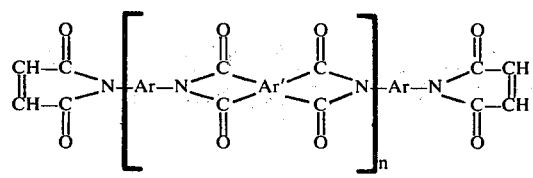

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
$n$ is 0 or a positive integer of 1 to 20.

The divalent aromatic radical Ar and the tetravalent aromatic radical Ar' can be any of the radicals described in polyimide patents known in the art that are derived from an aromatic diamine and an aromatic dianhydride respectively. Ar' preferably contains at least one ring of six carbon atoms characterized by benzenoid unsaturation. Any of the aromatic tetracarboxylic acid dianhydrides known in the prior art can be used to provide Ar'. Among the useful dianhydrides are 3,3',4,4'-benzophenonetetra-carboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6tetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride.

Preferred Ar' radicals are

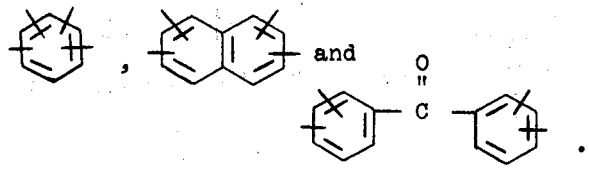

Ar is a divalent benzenoid radical selected from the group consisting of

and multiples thereof connected to each other by R, for example,

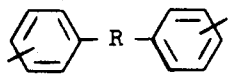

wherein R is an alkylene chain of 1—3 carbon atoms, —CH=CH—,

—O—, —S—, —SO$_2$—,

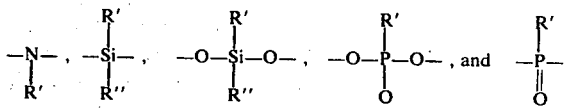

wherein R' and R'' are each selected from the group consisting of alkyl and aryl of 1 to 6 carbon atoms. Ar is preferably

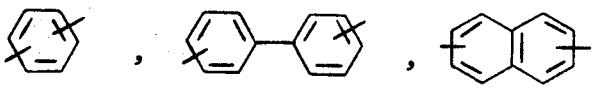

and

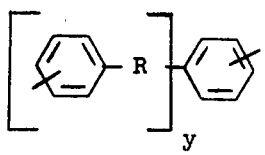

where R is

—O—, —S—, —CH=CH—, —CH$_2$—, —SO$_2$—, and y is 1 to 3.

Examples of aromatic diamines which are suitable to provide Ar are 4,4'-diaminodiphenyl propane, 4,4'-diamino-diphenyl methane, benzidine, 3,3'-dichlorobenzidene, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'diamino-diphenyl phenyl phosphine oxide, 4,4'-diamino-diphenyl N-methyl amine, 4,4'-diamino-diphenyl N-phenyl amine and mixtures thereof. 3,3'-dimethyl-4,4'diaminodiphenylmethane, 3,3'-diethyl-4,4'-diaminodiphenylmethane, 3,3'dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3' -dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines.

The term bis-maleimide within the scope of the formula is meant to include bis-maleimides when n is 0, e.g., N,N'-p-phenylene-bis-maleimide. Other suitable bis-maleimides which can be used when $n$ is 0 are N,N'-metaphenylene-bis-maleimide, N,N'-4,4'-diphenylmethane-bis-maleimide, N,N'-4,4'-diphenylether-bis-maleimide, N,N'-4,4'-diphenylsulphone-bis-maleimide, N,N'-m-xylene-bis-maleimide and N,N'-4,4'-diphenylcyclohexane-bis-maleimide.

Any solvent can be used in this process provided the bis-maleimide is soluble in it. The specific solvent will depend on the particular bis-maleimide used. In most cases, the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-$\alpha$-pyrrolidone, tetramethylurea, hexamethylphosphoramide, tetramethylene sulfone, N,N,N',N'-tetramethyl-$\alpha$-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)ether, N,N,N',N'-tetramethylfuraramide, methylsuccinonitrile, N,N-dimethylcyanoacetamide, N,N-dimethyl-$\beta$-cyano-propionamide, N-formyl-piperidine and butyrolactone, etc.

Of the solvents, dimethylacetamide is most preferred. Other preferred solvents are dimethylformamide, N-methyl pyrrolidone, dimethyl sulfoxide, butyrolactone and caprolactam.

In many cases, non-aprotic solvents can be used. For example, xylene, phenol, anisole, benzonitrile, acetophenone, methylphenylether, or mixtures of these with each other, the aprotic solvents or with relatively poor solvents such as benzene, toluene cyclohexane, cyclohexene, dioxane, butyl cellosolve and the like.

The time of B-staging will depend on the nature of the bis-maleimide, the boiling point of the solvent, the concentration of the bis-maleimide in the solvent and the pressure used, i.e., whether it is atmospheric, subatmospheric or superatmospheric. In general, the time for B-staging will range from a few minutes to 24 hours or more, depending on the parameters of the specific composition used. The pressure preferably used is atmospheric and the temperature is in the range of about 100°C. to about the boiling point of the specific solvent used, but temperatures in the range of about 100° to 250°C. are generally satisfactory. For most systems, a temperature range of about 120° to 180°C. is preferred.

The concentration of the bis-maleimide in the solvent can be in the range of 1–60 to 80% by weight of imide and solvent depending on the bis-maleimide, the solvent and the temperature used. Preferably, the concentration is between 10 and 60% by weight.

The oxygen used in the process of this invention can be oxygen itself or oxygen-containing gases such as air or oxygen mixed with inert gases such as nitrogen, helium, argon, krypton, xenon, etc., or with gases which are not reactive with the reagents in the system, such as carbon monoxide, methane, ethane, propane, etc. The oxygen or oxygen-containing gases can be introduced into the reaction system at reduced or atmospheric pressure or at high pressures in excess of atmospheric pressures in reaction vessels designed to withstand such pressures at the temperatures used in the reaction.

When the process is carried out in a solvent, the process can be interrupted at any desired increased molecular weight or viscosity from a dimer up to, and for some purposes, a solid B-staged polymer which can be isolated by either evaporating the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether, and water. Water and methanol are preferred.

The term B-staging is well known in the plastics art. It describes an increase in the molecular weight of the starting materials whereby the properties are enhanced to permit practical and useful applications of the product in commerce. When performed in solution, it is obvious that the B-staging process should be such that it can be controlled to a stage short of gelation. It was completely unexpected that the viscosity of the bis-maleimides could be controlled to a point short of gellation by the process of this invention.

The B-staged bis-maleimide solutions or isolated solid products can be cured by adding at catalytic amount (usually 0.01 to 5% by weight of the bis-maleimide and preferably about 1 to 5%) of an alkali metal salt of a Brönsted acid. The Brönsted acid salt catalyst used is an alkali metal (Na, K and Li) salt of an organic Brönsted acid having a $pk_a$ in the range of about 4 to 6, an alkali metal (Na, K and Li) cyanide or an alkali metal (Na, K and Li) carbonate. A preferred catalyst is a neutralized alkali metal salt of a monocarboxylic acid or dicarboxylic acid.

The use of the alkali metal salt catalyst is advantageous in that it eliminates the need for diamines as curing catalysts which yield cured products of lower thermal stabilities. Also, the alkali metal salt catalysts are particularly effective in curing at lower temperatures. The catalyst is most preferably an alkali metal (usually sodium or potassium) salt of a monocarboxylic acid or dicarboxylic acid having 2 to 12 carbon atoms, such as acetic acid, propionic acid and butyric acid. While the higher molecular weight monocarboxylic acids are not preferred, they are useful because of their usual solubility in organic solvents. Other useful catalysts are alkali neutralized dicarboxylic acids such as oxalic acid, malonic acid, succinic acid, glutaric acid, adipic acid, maleic acid, fumaric acid, itaconic acid, glutaconic acid. Sodium acetate and disodium maleate are preferred catalysts.

Representative organic Brönsted acids and their appropriate $pk_a$ values are as follows:

| Organic Acid | $pk_a$ |
| --- | --- |
| Acetic | 4.75 |
| Propionic | 4.87 |
| Butyric | 4.81 |
| i-Butyric | 4.84 |
| Heptanoic | 4.89 |
| Glutaric (2) | 5.41 |
| Fumaric | 4.44 |
| Benzoic | 4.19 |
| Succinic (1) | 4.16 |
| Ethylbenzoic | 4.35 |
| Ethylphenylacetic | 4.37 |
| Adipic | 4.43 |
| Ascorbic | 4.10 |
| Gamma chlorobutyric | 4.00 |
| Maleic (2) | 6.07 |
| Malic (2) | 5.11 |
| m-methyl cinnamic | 4.44 |

-continued

| Organic Acid | pk$_a$ |
| --- | --- |
| o-phthalic | 5.51 |
| m-phthalic | 4.60 |
| p-phthalic | 4.82 |
| Oxalic | 4.19 |
| Malonic (2) | 5.69 |

In addition to the catalyst, it is preferred that the curable solid product contain a catalyst activating amount of the aprotic organic compound described earlier as an activator for the catalyst. The activator can be used at any useful concentration but ordinarily a concentration of 0.01 to 5%, based on the weight of B-staged product, is sufficient with about 1 to 5% being preferred.

The process is particularly advantageous for the lower monomeric bis-maleimides, e.g., where $n$ is 0, which have poor tractability, i.e., high melting points and low solubility, and normally cannot be used in industrial processes for practical utility. By the present process these intractable bis-maleimides are converted to fusible, tractable, soluble intermediates which can be fabricated into products of utility.

For those bis-maleimides where $n$ is 1 to 20, the present process converts the materials into a condensed state or high molecular weight which makes the resulting products particularly useful in the impregnating and laminating arts to yield cured products which are substantially void free.

B-staged polyimides prepared by this process have many uses.

The compositions of the present invention have application in a wide variety of physical shapes and forms, including the use as films, molding compounds, coatings, etc. The unusual heat stability and resistance to deformation at elevated temperatures in the cured state, makes these compositions especially unique. When used as films or when made into molded products, these polymers, including laminated products prepared therefrom, not only possess excellent physical properties at room temperature but they retain their strength and excellent response to work-loading at elevated temperatures for long periods of time. The fact that they have high decomposition points well above 500°C., and in some instances above 550°C., indicates a wide range of commercial utility for these products. These polymers in particular resist fusion when exposed to temperatures of 410° to 520°C. for extended periods of time while still retaining an exceptionally high proportion of their room temperature physical properties. The ability to make fusible or soluble precursors of the finally cured products makes them especially suitable in the preparation of shaped articles such as films, molded products, etc. whereby using conventional techniques, the mixture of copolymerized ingredients can be converted in situ to the finally cured, infusible and insoluble state.

Films formed from the polymeric compositions of this invention may be used in applications where films have been used previously and in addition films therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for packaging items to be exposed to high temperatures or to corrosive atmospheres, in corrosion-resistant pipes and duct work, for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Films made from these compositions of matter can serve in printed circuit applications, for instance, as backings by coating the films made from such cured compositions with a thin layer of copper or aluminum either by coating the metal with the curable or heat-convertible compositions herein described and then by heating at elevated temperatures to convert the product to the completely cured state, or by laminating a metal sheet to the cured resinous composition. The circuit design is then covered by a protective coating and the extra metal is etched off followed by washing to prevent further etching. An advantage of making such circuit boards is that the base film is stable to heat so that it can be connected to other components by a dip soldering technique while in contact with the other components without adversely affecting the resinous support base.

Alternatively, solutions of the curable compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended. So-called resistance or semiconducting paints may also be made from the compositions by incorporating in solutions or dispersions of the curable polymeric mixture, controlled amounts of conducting materials such as carbon, silicon carbide, powdered metal, conducting oxides, etc. in order to impart to the cured paint the particular degree of resistance of semiconduction.

Among the specific applications for which the compositions herein defined may be employed include as finishes for the interiors of ovens, clothing driers, as finishes for cooking utensils, muffler liners, liners for high temperature equipment including liners for hot water heaters, as protective coatings for fragile or brittle substrates such as protective coatings for high temperature bulbs, glass equipment, etc., as flame-retardant paints, as belting for use in high temperature conveyors, etc.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenol-aldehyde resins, urea aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

The invention can be further understood by the following examples in which parts and percentages are by weight unless otherwise indicated.

EXAMPLE 1

In a 25-ml. flask equipped with a magnetic stirrer, a reflux condenser, a heating mantle and a gas inlet tube, there was placed 0.500 g. of N,N'-(oxy-di-p-phenylene)-dimaleimide (OPDM) and 10 ml. of xylene and a moderate stream of air passed through the solution. Then the solution was heated at reflux (about 140°C.) for 1½ hours, while air was passed through the yellow solution; after which the solution was concentrated on a rotary evaporator, leaving a yellow powder which was dried in a vacuum oven at 100°C. for 72 hours, leaving 0.506 g. (100%). When heated on a Fisher-Johns melting point apparatus, starting at ambient temperature, it softened at 100°C., to a resinous mass and was a viscous fluid at 160°C., and hardened at 250°C.

The B-staged product is soluble in hot toluene, methyl ethyl ketone, ethyl acetate, m-cresol, DMAC, and slightly soluble in 95% ethyl alcohol. In contrast, the original OPDM monomer is a crystalline, non-resinous substance which melts to a thin fluid at 165°C.

When placed on a Fisher-Johns apparatus, preheated at 160°C., and when exposed to air, the B-staged OPDM melted and did not harden in 15 minutes; but when it was covered and protected from air, it melted and did not harden in 30 minutes. However, when mixed with about 1% on bis-maleimide of sodium acetate and heated while exposed to air at 160°C., it hardened in 10 minutes to a thermally stable polymer whose TGA inflection point in nitrogen and air is in the 500°–550°C. region.

EXAMPLE 2

The same apparatus and procedure in Example 1 was used except that 10 ml. of DMAC was used as the solvent instead of xylene. The solution of OPDM in DMAC was heated at a reflux temperature of about 170°C. while air was passed slowly through the solution. After 1 hour of reaction, the solution was concentrated on a rotary flash evaporator and vacuum-dried at 100°C. for 72 hours, yielding 0.506 g. (100%) of a brown glassy resin. When heated on a Fisher-Johns apparatus, starting at ambient temperature, the B-staged OPDM softened at 80°C., resinified at 95°C., and hardened at 230°C. The glassy resin was soluble in hot DMAC, m-cresol; slightly soluble in hot methyl ethyl ketone; and insoluble in hot toluene, hot 95% ethyl alcohol and ethyl acetate.

When placed on a Fisher-Johns apparatus, preheated at 160°C., and exposed to air, the B-staged OPDM melted and did not harden in 15 minutes; when it was protected from air, it melted and did not harden in 30 minutes, but when it was mixed with about 2% of sodium acetate wet with DMAC, it cured at 160°C. within a few seconds.

EXAMPLE 3

Example 2 is repeated using 40 g. of OPDM in 100 ml. of DMAC. There is obtained a viscous solution of B-staged OPDM which is divided into 2 equal portions. Portion A is mixed with 500 ml. of water or methanol and a precipitated B-staged OPDM removed by filtration and dried in a vacuum oven. To Portion B is added 0.10 g. of sodium acetate to yield a convertible solution of the B-staged OPDM.

To the dried precipitate of portion A is added 15 g. of ⅛ inch glass fibers, 5 g. of asbestos fibers and 0.2 g. of sodium acetate. This mixture is homogeneously blended and preformed to a 1 inch disc. These preforms are molded at 200°–220°C. at 1500 psi for 3 minutes to yield thermally stable, strong, well knit discs.

The solution of portion B containing the Bronsted acid, salt catalyst is knife coated onto asbestos board and is treated in an oven at 130°C. for 2 hours, 170°C. for 2 hours, 190°C. for 1 hour and 220°C. for 1 hour. A glossy, dark brown continuous film which is crosslinked, thermally stable, water-resistant and solvent resistant is obtained.

EXAMPLE 4

The procedure of Example 3 is repeated using a 20% solution of N,N'-m-phenylene dimaleimide in dimethylformamide. The reaction is allowed to continue for 6 hours. Similar results are obtained.

EXAMPLE 5

Example 3 is repeated for 2 hours using a 15% solution of N,N'-[1,3-Di-(3-aminophenoxy)benzene] dimaleimide (APDM), prepared as in Example 2(b) of my aforesaid parent application, in dimethyl sulfoxide. Similar results are obtained.

EXAMPLE 6

Example 3 is repeated over a reaction time of 3 hours using a 25% solution of N,N'-(sulfonyl-p-phenylene)-dimaleimide (SPDM), prepared as in Example 3(b) of my aforesaid parent application, in butyrolactone. Similar results are obtained.

Similar results are obtained when oxygen is used in place of air over a reaction time of 0.5 hour.

EXAMPLE 7

This example repeats Example 3 using the maleimide-terminated polyimide (BTMI-1), prepared in Example 4 of my aforesaid parent application, having a molar ratio of 1:2:2 of 3,3',4,4'-benzophenonetetracarboxylic acid dianhydride (BTDA), oxydianiline (ODA) and maleic anhydride. A 10% solution of BTMI-1 in dioxane is reacted for 8 hours. Similar results are obtained.

EXAMPLE 8

This example repeats Example 3 using (BTMI-3) prepared in Example 6 of my aforesaid parent application. (BTMI-3) is a maleimide-terminated oligomeric polyimide having a molar ratio of 8:9:2 of BTDA, 3,3'-sulfonyldianiline (SDA-3,3) and maleic anhydride. A 35% solution of (BTMI-3) in sulfolane is used. Similar results are obtained.

What is claimed is:

1. A process of B-staging a bis-maleimide of the formula:

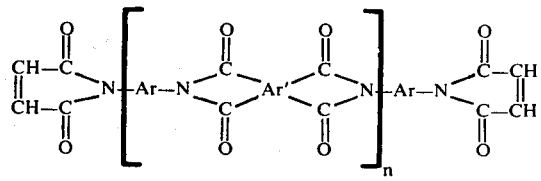

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and n is 0 or a positive integer of 1 to 20, in a solvent which is inert to the bis-maleimide by passing oxygen or an oxygen-containing inert gas through the solution at a temperature from about 100°C. to about the boiling point of the solvent.

2. The process of claim 1 wherein the oxygen-containing gas is air.

3. The process of claim 3 wherein n in the formula is 0.

4. The process of claim 1 wherein n in the formula is 1 to 20.

5. The process of claim 3 wherein Ar in the formula is $C_6H_4$.

6. The process of claim 3 wherein Ar in the formula is

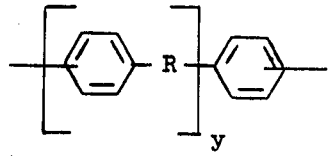

wherein R is

—S—, —CH=CH—, —CH$_2$—, —O— or —SO$_2$—, and y is a positive integer of 1 to 3.

7. The process of claim 1 wherein the B-staged bis-maleimide is isolated as a solid product.

8. The process of claim 7 wherein the solvent is removed by evaporation.

9. The process of claim 7 wherein the solid product is removed as a precipitate by the addition of a non-solvent for the bis-maleimide.

10. The process of claim 9 wherein the non-solvent is water or methanol.

11. The process of claim 1 wherein the solvent is an aprotic organic compound having a dielectric constant between about 35 and 45.

12. The process of claim 11 wherein the aprotic solvent is water soluble.

13. The process of claim 12 wherein the aprotic solvent is dimethylacetamide or dimethylformamide.

14. The process of claim 5 wherein the bis-maleimide is m-phenylene bis-maleimide.

15. The process of claim 1 wherein the temperature is in the range of about 120° – 180°C.

16. The process of claim 1 wherein a catalytic amount of an alkali metal salt of a Bronsted acid is added to the solution at the completion of B-staging, said salt selected from the group consisting of an alkali metal salt of an organic acid having a PKa in the range of about 4 to 6, an alkali metal cyanide and an alkali metal carbonate.

17. The solution prepared by the process of claim 16.

18. A curable mixture comprising the B-staged bis-maleimide prepared by the process of claim 7 and a catalytic amount of an alkali metal salt of a Bronsted acid, said salt selected from the group consisting of an alkali metal salt of an organic acid having a pKa in the range of about 4 to 6, an alkali metal cyanide and an alkali metal carbonate.

19. The curable mixture of claim 17 wherein the mixture contains a catalyst activating amount of an aprotic organic compound having a dielectric constant between about 35 and 45.

20. The thermal crosslinked bis-maleimide of claim 17.

21. The thermal crosslinked bis-maleimide of claim 18.

22. The solution prepared by the process of claim 1.

23. The curable mixture of claim 18 wherein the mixture contains a catalyst activating amount of an aprotic organic solvent having a dielectric constant between about 35 and 45.

* * * * *